United States Patent [19]

Fisher et al.

[11] Patent Number: 4,468,972
[45] Date of Patent: Sep. 4, 1984

[54] FLOW METER WITH A MOTOR DRIVEN IMPELLER

[75] Inventors: Gene A. Fisher, Lafayette, Colo.; Raymond E. Umbaugh, Sr., deceased, late of Boulder, Colo., by Phyllis L. Umbaugh, administratrix

[73] Assignee: Universal Cooperatives, Inc., Minneapolis, Minn.

[21] Appl. No.: 369,540

[22] Filed: Apr. 19, 1982

[51] Int. Cl.³ ............................................. G01F 1/80
[52] U.S. Cl. .............................. 73/861.38; 73/862.33
[58] Field of Search ........... 73/861.38, 861.37, 861.36, 73/862.33

[56] References Cited

U.S. PATENT DOCUMENTS

| | | | |
|---|---|---|---|
| 2,714,310 | 8/1955 | Jennings | 73/861.36 |
| 2,771,773 | 11/1956 | Wallace | 73/861.38 |
| 2,775,125 | 12/1956 | Peaceman | 73/861.38 |
| 2,907,208 | 10/1959 | Taylor | 73/861.36 |
| 3,027,473 | 3/1962 | Bodge | 73/861.36 X |
| 3,104,544 | 9/1963 | Guiot | 73/862.33 |
| 3,171,280 | 3/1965 | Levins | 73/861.36 |
| 3,196,675 | 7/1965 | Buchele et al. | 73/862.33 |
| 3,331,244 | 7/1967 | Henderson | 73/861.38 |
| 3,625,055 | 12/1971 | LaFourcade | 73/862.33 |
| 4,149,411 | 4/1979 | Fisher et al. | 73/198 |

Primary Examiner—Gerald Goldberg
Assistant Examiner—Brian R. Tumm
Attorney, Agent, or Firm—Schroeder, Siegfried, Vidas & Arrett

[57] ABSTRACT

A liquid meter including a freely rotatable impeller driven by a constant speed drive. Liquid to be metered is introduced as a flow against, and accelerated by, the impeller. The energy necessary to accelerate the liquid is monitored to determine liquid flow. Preferably, the impeller is driven through a magnetic coupling which facilitates isolation of at least large portions of the drive from the liquid flow. One preferred embodiment employs a pair of spring coupled shutters with one shutter being magnetically coupled to the impeller. The displacement of the spring is dependent on liquid flow with that displacement being determined by photoelectrically monitoring the relative positions of the shutters. The power necessary to maintain the drive at constant speed may also, or alternatively, be monitored to determine liquid flow.

18 Claims, 14 Drawing Figures

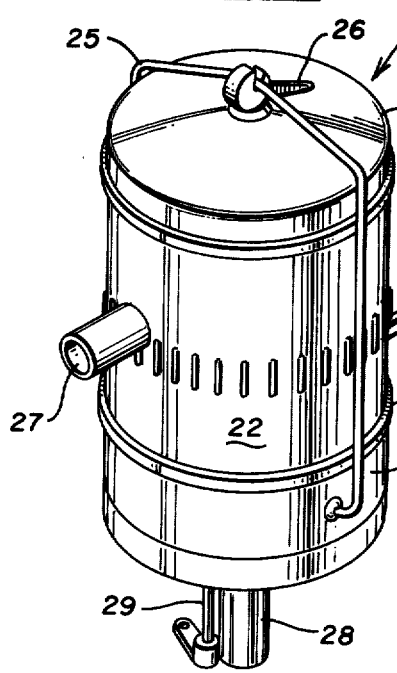
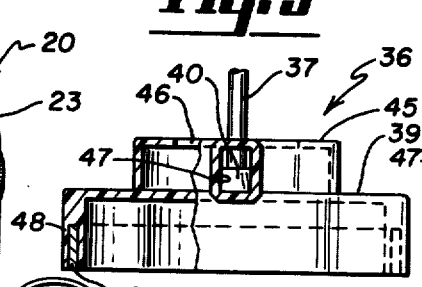
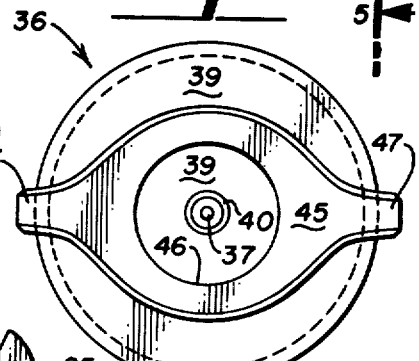
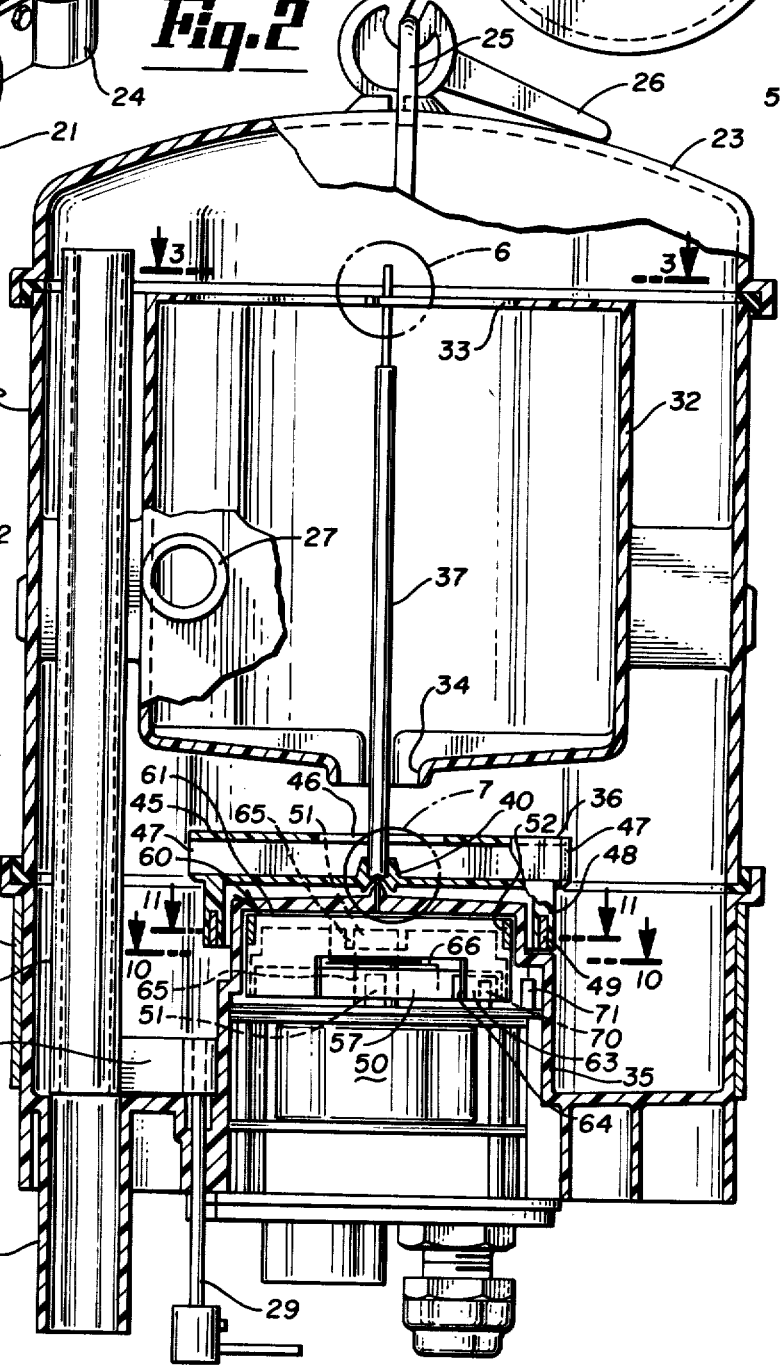
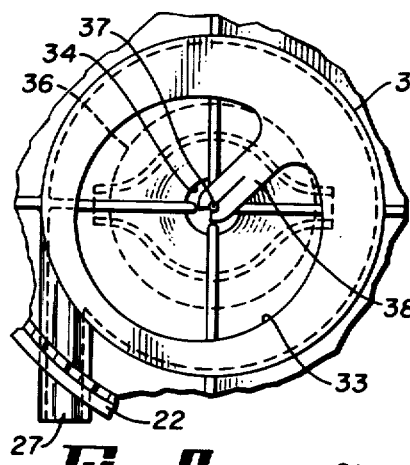
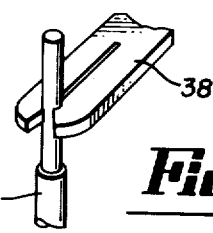
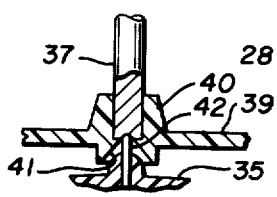

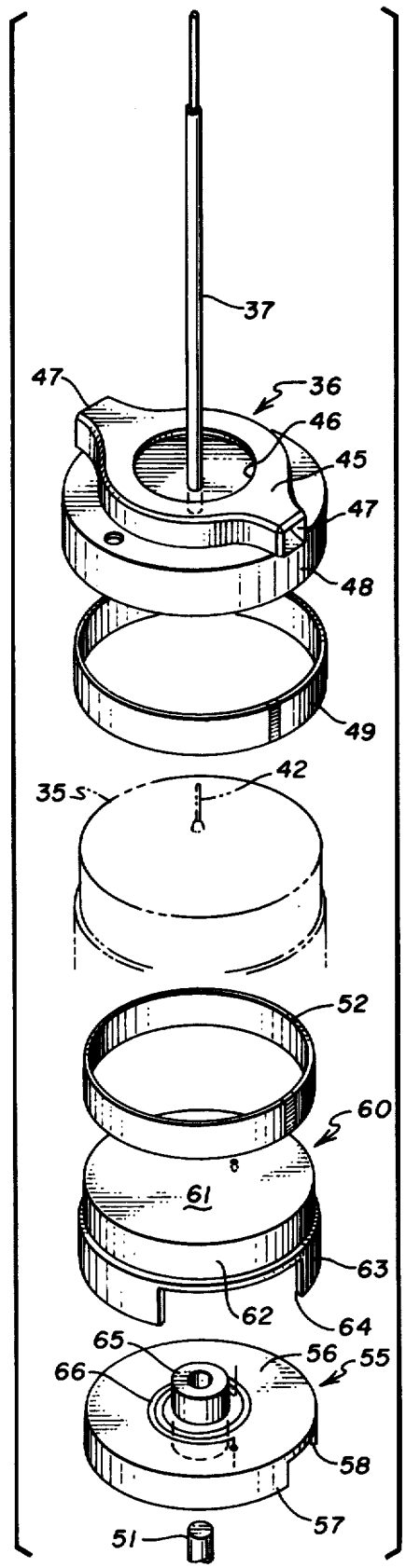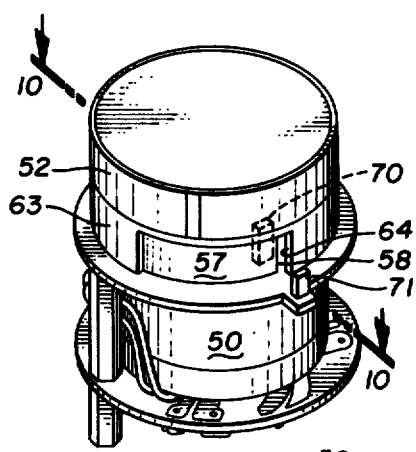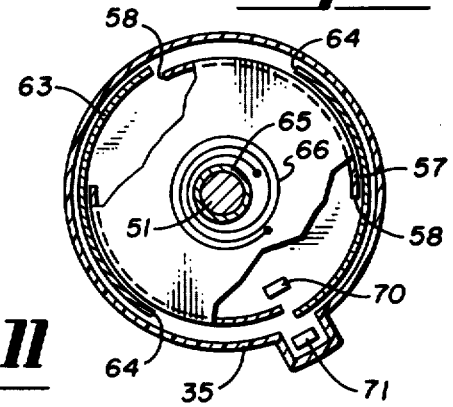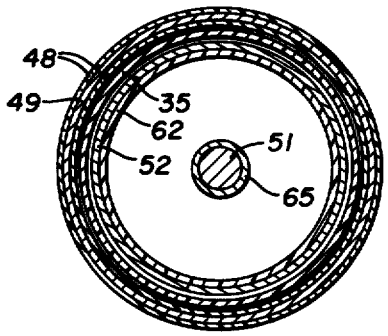

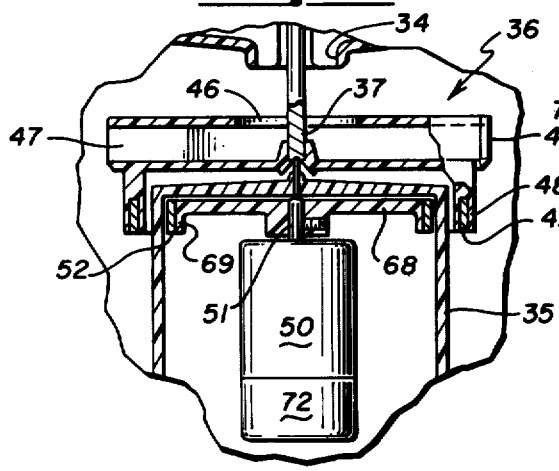
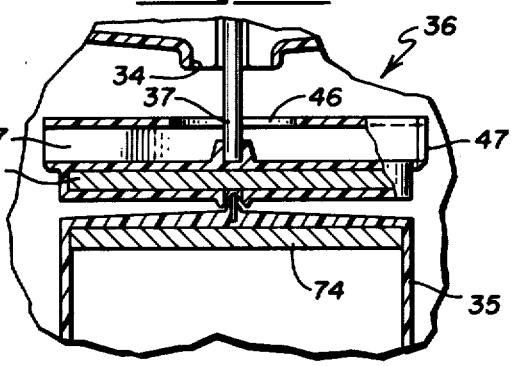
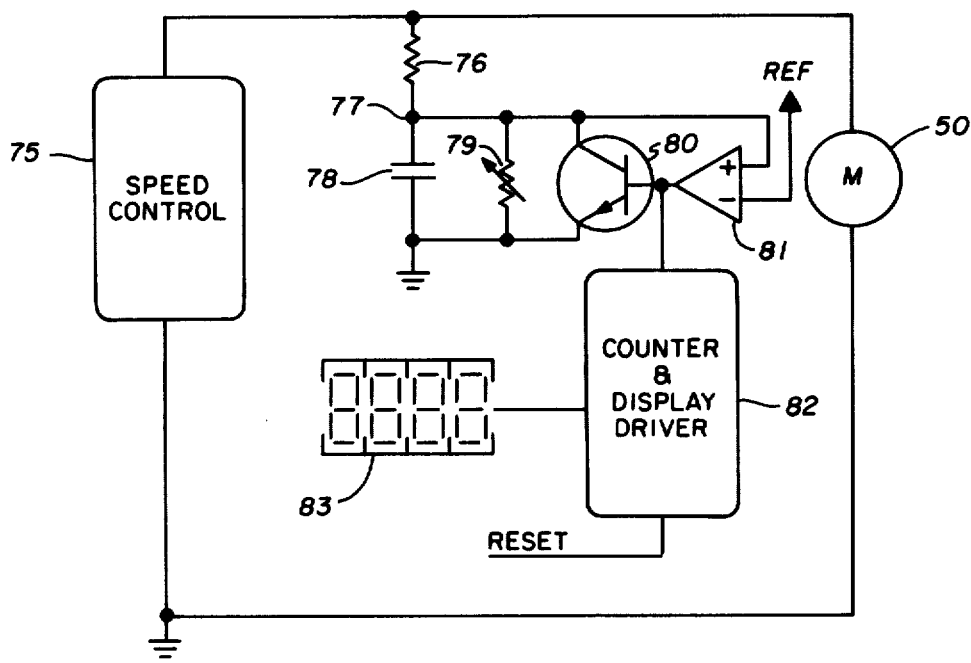

FLOW METER WITH A MOTOR DRIVEN IMPELLER

DESCRIPTION

Background of Prior Art

Devices for measuring volumes of liquids such as milk, have been heretofore known, but none of them have adequately met the needs of the milk industry in which it has become increasingly important to have an accurate measurement of the milk flow from each animal. Most such devices have been relatively crude and expensive, insufficiently accurate, difficult to clean, and subject to excessive wear from impurities within the milk flow. An example of such prior art is shown in U.S. Pat. No. 3,978,460. The most recent and most pertinent prior art is that shown in U.S. Pat. No. 4,149,411 in which a rotative wheel having cavities in its periphery to receive the milk is rotated, and the effect of the weight of the milk in the cavities is measured. Our present invention is more adequate and accurate, less expensive, easy to clean, and less subject to wear.

BRIEF SUMMARY OF INVENTION

We have provided a highly simplified, less expensive, less subject to wear, and more accurate milk meter in which the milk is introduced to flow against a freely rotatable impeller, which is rotated by an electric motor drivably connected thereto by a magnetic coupling and includes a torque sensing assembly which translates its torque measurements into a visual reading indicating the volume of milk required to produce that torque upon the impeller. A non-magnetic housing surrounds the motor drive, supports the impeller upon a needle-point pivot, and extends between the opposite poles of the magnetic coupling, whereby cleaning is facilitated and minimum friction is involved in the impeller mounting.

In one form of the invention, a pair of relatively rotatable shutters connected by a weak spring are disposed within the drive train and the time of light admitted through their adjacent openings is proportional to the torque applied against the impeller by the milk flow. Sensor means measures the time of such light and produces a signal which is converted into a direct volume reading by a micro processor.

In a second form of the invention, the amount of torque is determined by measuring the amount of electric current which is required to operate the constant speed motor. That measurement is similarly converted into a visual display showing a direct volume reading.

In a third form of the invention, a non-metallic housing encases the stator of a constant speed motor and supports the rotor with an attached impeller thereabove, the amount of electrical power needed to rotate the rotor at a constant speed being measured to reflect the volume of milk flow which produces the drag upon the impeller.

BRIEF DESCRIPTION OF DRAWINGS

FIG. 1 is a perspective view of a flow meter embodying the present invention.

FIG. 2 is a side cutaway view of the embodiment of FIG. 1.

FIG. 3 is a partial cross-sectional view taken along the lines 3—3 in FIG. 2.

FIG. 4 is a top view of a portion of the embodiment of FIGS. 1 and 2.

FIG. 5 is a cross-section and partial cutaway view taken along the lines 5—5 in FIG. 4.

FIG. 6 is an expanded view of that portion of FIG. 2 within the line 6.

FIG. 7 is an expanded view of that portion of FIG. 2 within the line 7.

FIG. 8 is an exploded view of a portion of the embodiment illustrated in FIG. 2.

FIG. 9 is a perspective view of a portion of the embodiment of FIG. 2.

FIG. 10 is a cross-section taken along the lines 10—10 in FIGS. 2 and 9.

FIG. 11 is a cross-section taken along the lines 11—11 in FIG. 2.

FIG. 12 is a partial cross-sectional view illustrating another preferred embodiment of the present invention.

FIG. 13 is another partial cross-sectional view illustrating yet another preferred embodiment of the present in invention.

FIG. 14 is a schematic illustration of a control circuit in accordance with the present invention.

DETAILED DESCRIPTION OF INVENTION

Referring now to FIG. 1, there is illustrated generally at 20 a flow meter particularly adapted to meter milk flow from individual animals. The meter includes a lower housing portion 21, an intermediate housing portion 22 and a cover 23. The meter is supported by a mount 24 while a bail 25 and latch 26 secure the housing members to each other. Fluid to be metered enters at an inlet 27 and exits through an outlet 28. A rotatable rod 29 terminates at a nob and will be discussed more fully below.

FIG. 2 illustrates a side cutaway view of the meter of FIG. 1 with the housing sections secured to each other. The lower housing portion 21 supports the rod 29 which extends through the base of the housing to a crank 30. The crank 30 extends between the rod 29 and a tube 31, the tube 31 being rotatable on rotation of the nob carried by the rod 29 between a position where it overlies and blocks the outlet 28 and a position where it is spaced from the outlet 28 in unblocking relation thereto. The tube 31 is used during cleaning of the meter and is positioned, during cleaning, over the outlet 28 to block it causing the cleaning fluid to accumulate within the housing until it reaches the top of the tube 31. During normal metering operation, the tube 31 is swung away from the outlet 28 allowing the metered fluid to exit unimpeded.

The central housing portion 22 supports a receiving receptacle or chamber 32 into which the inlet 27 extends. The chamber 32 has a large opening 33 in the top and an exit port 34 at the bottom. The opening 33 is sufficiently large to allow the escape of any air that enters through the inlet 27 and, thereby, avoid an acceleration of the liquid to be monitored through the outlet port 34 that might be induced by such air.

The lower housing portion 21 includes an inner housing 35 which, in the illustrated embodiment, is formed of a non-magnetic material that is relatively impermeable to the liquid being monitored and which houses the powered portions of the drive system and sensing system, in a manner to be described more fully below. The inner housing 35 supports an impeller 36 on a needle bearing illustrated within the line 7, the impeller carrying a shaft 37 which extends through the chamber outlet port 34 to a journal illustrated within the line 6. As shown in FIGS. 3 and 6, the journal may take the form of a clip 38 formed integrally with the chamber 32 to extend over the opening 33 to engage the shaft 37. The engagement between the clip 38 and shaft 37 is such that the shaft 37 is freely rotatable within the clip 38.

As best illustrated in FIG. 7, impeller 36 has a floor 39 with a central hub 40. The hub 40 supports the shaft 37, the shaft 37 extending to a cone-shaped opening 41 on the underside of the floor 39. A needle 42 is supported by the housing 35 in any desired manner and engages the exposed end of the shaft 37 within the opening 41. Thus, the impeller 36 is supported by the support of the shaft 37 at both its upper and lower ends for free rotation with the shaft 37 about its axis.

FIGS. 4 and 5 show the detail of the impeller 36 including the floor 39, hub 40 and shaft 37. Extending upwardly from the floor 39 is a cup 45 having a central opening 46. The central opening 46 is generally circular and concentric with the hub 40 and shaft 37 while the cup 45 has two opposing elongated portions terminating in opposing spouts 47. A flange 48 extends downwardly from the floor 39 and carries a circular magnet 49 for reasons to be described more fully below.

The housing 35 contains a drive system for the impeller 36, the drive system to be described more fully below. Housing 35 isolates the drive system, or major portions thereof, from the liquid whose flow is being metered. The drive system is a constant speed drive including a motor 50. The output shaft 51 of the motor 50 powers a drive system to be described more fully below and which includes a circular magnet 52. The magnets 49 and 52 magnetically couple such that rotation of the shaft 51 of motor 50 results in rotation of the impeller 36. Liquid entering the inlet 27 will be discharged through the port 34 to the cup portion 45 of impeller 36 through the inlet 46. Rotation of the impeller will cause the liquid to flow out through the sprouts 47 of the impeller 36 and, eventually, out of the outlet 28. However, because of the rotation of the impeller, and the change in direction of the liquid as it flows through the impeller 36, the liquid will accelerate. This acceleration will require increasing amounts of power with increasing amounts of liquid flow in order to maintain a constant impeller rotational speed. This power increase may be monitored and related directly to the liquid flow volume.

FIGS. 8-11 illustrate a preferred embodiment of a system for monitoring the additional power requirements resulting from a flow of a liquid to be monitored through the rotating impeller 36. In FIG. 8, the housing 35 is illustrated with upstanding pin 42. Impeller 36 carries the circular magnet 49 at the flange 48 with the shaft 37 cooperating with the pin 42 and clip 38 (See FIGS. 3 and 6) to support the impeller 36 for rotation. The flange 48 and magnet 49 depend downwardly to surround the upper portion of the housing 35. Within the housing 35, a first shutter member 55 is secured to the shaft 51 in any desired manner, as by a setscrew, for example. Thus, the shutter 55 rotates with the shaft 51. The shutter 55 includes an upper platform 56 and depending sidewall 57, the sidewall 57 including a shutter forming opening 58. Positioned above the shutter 55 is a second shutter 60 having a platform 61, a first depending sidewall portion 62 and a second depending sidewall portion 63, the second sidewall portion 63 including a shutter forming opening 64. The first sidewall portion 62 of shutter 60 supports the circular magnet 52 while the platform 61 is secured to the shaft 51 in a manner which allows free rotation between the shutter 60 and shaft 51, as by a bearing 65 secured to the shaft 51 and the platform 61 in any known or desired manner. A torsion spring 66 has one end connected to the platform 56 of shutter 55 and its other end connected to the platform 61 of shutter 60 as by having its ends pass through holes in the platform of the respective shutters as illustrated, for example.

In operation, on rotation of the shaft 51 the shutter 55 is direct driven while the shutter 60 is driven through the interconnection between it and the shutter 55 via the spring 66. Magnetic coupling between the magnet 52 and the magnet 49 will result in rotation of the impeller 36. On the introduction of a liquid into the cup 45 via the opening 46, extra power will be required to maintain a constant speed of the impeller 36 as the liquid is accelerated and discharged through the spouts 47. This extra power requirement will be manifested by a coiling of the spring 66 to result in a relative displacement between the shutter openings 64 and 58 of the shutters 60 and 55, respectively. An increasing amount of liquid will result in an increasing shutter opening relative displacement. Thus, by monitoring the relative positions of the shutters, the amount of liquid passing through the impeller 36 may be determined. This is accomplished by monitoring the opening established through both of the shutters 55 and 60. For example, if the shutter openings are positioned relative to each other to define but a small opening through both of them, and this condition is maintained during impeller rotation without any liquid flow, that condition will indicate a zero fluid flow condition. With the addition of liquid flow through the impeller, the shutter 60 will be retarded relative to the shutter 55 resulting in an increasing opening formed by the shutter openings 64 and 58. The amount of retardation establishes the amount of liquid flowing through the impeller 36. This may be monitored as by placing a light source within the shutter 55 and a photosensitive element outside the shutter 60 with the duration of light detection indicating the relative position between the shutter openings 64 and 58. This duration of light detection can be directly related to the volume of liquid flow, either instantaneously or cumulatively in any desired manner. This detection system is illustrated in FIGS. 9 and 10, there being two shutters 55 and 60 shutter openings 58 and 64 in each of the shutters 60 and 55, respectively. Internally of the shutter 55 is positioned a light source 70 while a photodetector 71 is positioned outside the shutter 60. The relative position illustrated in FIGS. 9 and 10 of the shutter openings 64 and 58 may be indicative of a no-load condition, a slight opening being preferable to a total closing in that the short duration light detection can indicate the operability of the source 70 and detector 71. All of the mechanism illustrated in FIG. 9, including the motor 50, may be housed within the housing 35 so as to be isolated from the fluid being metered. FIG. 11 illustrates the relative position of the elements forming the magnetic coupling through the non-magnetic housing 35.

FIGS. 12 and 13 illustrate alternative drive mechanisms in accordance with the present invention. In FIG. 12, the impeller 36 may be identical to that described above with reference to FIGS. 1-11, including its support. Within the housing 35, there is positioned a motor 50 which also may be identical to that described above. However, there are no shutters employed. Instead, a platform 68 is secured to the shaft 51 of motor 50, as by a set screw, platform 68 carrying a flange or sidewall 69 which supports a circular magnet 52. The magnet 52 may be identical to that discussed above to couple with the magnet 49 carried by the impeller 36 to result in rotation of the impeller 36 on rotation of the motor shaft 51. Motor speed may be monitored as by a tachometer 72 and the information relating to motor speed and motor current can be directly related to the power necessary to drive the impeller 36 and, accordingly, the volume of liquid flow through the impeller 36.

Another alternative drive is illustrated in FIG. 13 wherein the impeller 36 carries the rotor 73 of a DC motor. The motor stator 74 may be housed within the housing 35 with the other connections and controls of the motor being as known to the prior art. Again, in the embodiment of FIG. 13, there is a magnetic coupling between the housing 35 and the impeller 36.

FIG. 14 illustrates a motor control which may be employed within the present invention to relate the power drawn by the motor to the liquid flow through the impeller 36. A DC motor 50 is interconnected with a speed control 75 which acts to maintain the speed of the motor 50 constant. Speed control 75 may be that designated by its manufacturer, National Semiconductor Corporation, as LM1014. A resistor 76 is connected between the motor 50 and speed control 75 and to a junction 77. The junction 77 is connected to ground via a capacitor 78 and a variable resistor 79 as well as to the collector of a transistor 80 and to an input of a comparator 81. The other input to comparator 81 is connected to a reference potential. The output of comparator 81 is connected to the base of transistor 80 and to a counter and display driver 82. The emitter of transistor 80 is connected to ground. The display driver 82 is connected to a display 83 and is provided with a reset line. The comparator 81 and counter and display driver 82 may be those designated by their manufacturer, National Semiconductor Corporation, as LM311 and MM74C25, 26, 27 or 28, respectively. In operation, the current flowing to the motor 50 from the speed control 75 results in a charging of the capacitor 78 through the resistor 76, the resistor 76 being a current limiting resistor. The charging rate of the capacitor 78 is established by the variable resistance 79, in known manner. The charge level on the capacitor 78 is monitored by the comparator 81. Once that voltage level reaches the voltage of the reference potential, the output of the comparator 81 goes high turning the transistor 80 "on" resulting in a discharge of the capacitor 78 and an increment of the counter and display driver 82. The state of the counter and display driver 82 is displayed by a display 83, in known manner. Thus, the display 83 provides a continuously updated display of the volume or weight of liquid that has flowed through the impeller 36 in that the current drawn by the motor 50 is dependent on the power required to drive the impeller which is, in turn, dependent on the volume flow of liquid through the impeller 36. The counter and display driver 82 may be reset, either manually or after a predetermined interval without an update, by a signal on the reset line.

Obviously, many modifications and variations of the present invention are possible in light of the above teachings. For example, alternative driving systems for the impeller 36 have been illustrated. Differing configurations for the impeller 36 may be employed along with different systems for monitoring the increases in power or energy necessary to drive the impeller resulting from the flow of a liquid therethrough. Accordingly, the invention may be practiced otherwise than as specifically described without departing from the scope of the appended claims.

I claim:
1. A fluid meter comprising:
   (a) inlet means for receiving a predetermined fluid;
   (b) fluid receiving means connected to said inlet means for receiving such fluid therefrom;
   (c) a rotatably mounted impeller member associated with said fluid receiving means and receiving such fluid thereagainst from said inlet means, said impeller member being constructed and arranged to accelerate such fluid primarily radially and thereby cause such fluid to create a force retarding the rotation of said impeller while receiving such fluid thereagainst;
   (d) powered drive means associated with said impeller member in driving relation and located directly therebelow; said impeller member being rotatably driven by magnetic means carried by said drive means and said impeller member;
   (e) sensor means associated with said impeller and sensing the extent of such retarding force thereagainst and providing, in response thereto, an electrical signal indicative of the amount of fluid introduced against said impeller; and
   (f) outlet means receiving fluid from said fluid receiving means and discharging the same from said meter.

2. The structure defined in claim 1 and
   (h) a protective non-metallic housing interposed between said sensor means and said impeller member and providing a liquid-impervious seal therebetween.

3. The structure defined in claim 1, and
   (g) a protective non-metallic housing surrounding at least portions of said sensor means and sealing the same from liquid received and discharged by said impeller member;
   (h) said housing being interposed between said sensor means and said impeller member;
   (i) said impeller member being mounted upon said housing for free rotation relative thereto.

4. The structure defined in claim 3, and
   (j) the magnetic means carried by each of said drive means and said impeller member being at opposite sides of said non-metallic housing and rotatably driving said impeller member.

5. A fluid meter comprising:
   (a) inlet means for receiving a predetermined fluid;
   (b) fluid receiving means receiving such fluid from said inlet means;
   (c) a rotatably mounted impeller member associated with said fluid receiving means and receiving such fluid thereagainst from said inlet means, said impeller member being constructed and arranged to receive such fluid axially and to direct same primarily radially to thereby create a force retarding its rotation;
   (d) constant-speed powered drive means associated with said impeller member in rotative driving relation thereto and located directly therebelow, said impeller member being rotatively driven by magnetic means carried by said drive means and said impeller member;
   (e) sensor means associated with said impeller member and sensitive to its said retarding force and responsive thereto and providing, in response, an electrical signal indicative of the amount of fluid introduced against said impeller; and (f) outlet means receiving fluid from said fluid receiving means and discharging same from said meter.

6. The structure defined in claim 5, and (g) a protective non-metallic housing interposed between said sensor means and said impeller member and providing a liquid-impervious seal therebetween.

7. The structure defined in claim 5, and (g) a protective non-metallic housing surrounding at least a portion of said drive means and sealing the same from the liquid received and discharged by said impeller member;

(h) said housing being interposed between said portion of said drive means and said impeller member;

(i) said impeller member being mounted upon said housing for free rotation relative thereto.

8. The structure defined in claim 7, and (g) the magnetic means carried by each of said drive means and said impeller member being at opposite sides of said non-metallic housing and rotatably driving said impeller member.

9. A liquid meter comprising:

(a) a shutter;

(b) drive means connected to said shutter for rotating the same at a constant predetermined speed of rotation;

(c) a second shutter mounted for rotation relative to said first mentioned shutter about the same axis and in position to cooperatively and variably permit light to pass through said shutters;

(d) a source of light directed toward said shutters;

(e) a torsion spring connected between said shutters in driving relation to said second shutter;

(f) magnetic means carried by said second mentioned shutter;

(g) an impeller mounted for free rotation about the axis of rotation of said shutters and constructed and arranged to receive fluid thereagainst and accelerate the same in a primarily radial direction to thereby create a force retarding the rotation thereof;

(h) magnetic means carried by said impeller adjacent said first mentioned magnetic means and constructed and arranged relative thereto to cooperatively rotatively drive said impeller with said second shutter;

(i) means for introducing a flow of liquid to be metered against said impeller; and (j) sensor means associated with said second mentioned shutter for sensing the degree of rotation thereof relative to said first mentioned shutter caused by such a flow of liquid against said impeller and, responsive thereto, providing an electrical signal indicative of the amount of liquid introduced against said impeller.

10. The structure defined in claim 9 wherein said impeller member is comprised of an elongated open-ended trough extending diametrically with respect to its axis of rotation.

11. The structure defined in claim 10 wherein said open-ended trough has a widened central portion and restricted oppositely disposed outer end portions.

12. The structure defined in claim 11 wherein said widened central portion of said trough opens upwardly and receives fluid therein from said fluid-introducing means.

13. The structure defined in claim 12 wherein said open central portion is axially disposed and the fluid is discharged radially outwardly through said open ends of said trough.

14. The structure defined in claim 9, and means electrically connected with said sensor means for receiving said electrical signal, translating the same into units of volume flow, and displaying the same for ready visual reference.

15. The structure defined in claim 9, and (j) a protective non-metallic housing interposed between said sensor means and said impeller member and providing a liquid-impervious seal therebetween.

16. The structure defined in claim 15, and (k) said impeller member being mounted upon said housing for free rotation relative thereto.

17. A fluid meter comprising:

(a) inlet means for receiving a predetermined fluid;

(b) fluid receiving means connected to said inlet means for receiving such fluid therefrom;

(c) a rotably mounted impeller member associated with said fluid receiving means and receiving such fluid thereagainst from said inlet means, said impeller member being constructed and arranged to accelerate such fluid primarily radially and thereby cause such fluid to create a force retarding the rotation of said impeller while receiving such fluid thereagainst;

(d) power drive means associated with said impeller member in driving relation;

(e) sensor means associated with said impeller and sensing the extent of such retarding force thereagainst and providing, in response thereto, an electrical signal indicative of the amount of fluid introduced against said impeller;

(f) a protective non-metallic housing surrounding at least portions of said sensor means and sealing the same from liquid received and discharged by said impeller member;

(g) said housing being interposed between said sensor means and said impeller member;

(h) said impeller member being mounted upon said housing for free rotation relative thereto;

(i) cooperative magnetic means carried by each of said drive means and said impeller member at opposite sides of said non-metallic housing and rotatably driving said impeller member; and (j) outlet means receiving fluid from said fluid receiving means and discharging the same from said meter.

18. A fluid meter comprising:

(a) inlet means for receiving a predetermined fluid;

(b) fluid receiving means receiving such fluid from said inlet means;

(c) a rotatably mounted impeller member associated with said fluid receiving means and receiving such fluid thereagainst from said inlet means, said impeller member being constructed and arranged to receive such fluid axially and to direct same primarily radially to thereby create a force retarding its rotation;

(d) a constant speed power drive means associated with said impeller member in rotative driving relation thereto;

(e) sensor means associated with said impeller member and sensitive to its said retarding force and responsive thereto and providing, in response, an electrical signal indicative of the amount of fluid introduced against said impeller;

(f) a protective non-metallic housing surrounding at least a portion of said drive means and sealing the same from the liquid received and discharged by said impeller member;

(g) said housing being interposed between said portion of said drive means and said impeller member;

(h) said impeller member being mounted upon said housing for free rotation relative thereto;

(i) cooperative magnetic means carried by each of said drive means and said impeller member at opposite sides of said non-metallic housing and rotatably driving said impeller member; and (j) outlet means for receiving fluid from said fluid receiving means and discharging same from said meter.

* * * * *